(12) United States Patent
Formby et al.

(10) Patent No.: US 10,986,107 B2
(45) Date of Patent: Apr. 20, 2021

(54) SYSTEMS AND METHODS FOR DETECTING ANOMALOUS SOFTWARE ON A PROGRAMMABLE LOGIC CONTROLLER

(71) Applicant: Georgia Tech Research Corporation, Atlanta, GA (US)

(72) Inventors: David Formby, Atlanta, GA (US); Abdul Raheem Beyah, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 277 days.

(21) Appl. No.: 16/302,727

(22) PCT Filed: May 22, 2017

(86) PCT No.: PCT/US2017/033756
§ 371 (c)(1),
(2) Date: Nov. 19, 2018

(87) PCT Pub. No.: WO2017/201520
PCT Pub. Date: Nov. 23, 2017

(65) Prior Publication Data
US 2019/0297095 A1    Sep. 26, 2019

Related U.S. Application Data

(60) Provisional application No. 62/339,174, filed on May 20, 2016.

(51) Int. Cl.
*H04L 29/06* (2006.01)
*G05B 19/05* (2006.01)
(Continued)

(52) U.S. Cl.
CPC .......... *H04L 63/1416* (2013.01); *G05B 11/01* (2013.01); *G05B 19/058* (2013.01);
(Continued)

(58) Field of Classification Search
CPC . H04L 63/1416; H04L 63/0227; G05B 11/01; G05B 19/058; G05B 2219/14065; G06F 17/11; G06F 21/552; G06F 9/4401
See application file for complete search history.

(56) References Cited

U.S. PATENT DOCUMENTS

| 9,032,522 B1 | 5/2015 | Mulder et al. |
| 2008/0126352 A1 | 5/2008 | Case |

(Continued)

FOREIGN PATENT DOCUMENTS

WO    2014/204635    12/2014

OTHER PUBLICATIONS

European Search Report from Application No. EP 17800322 dated Dec. 11, 2019 (11 pages).
(Continued)

*Primary Examiner* — Sarah Su
(74) *Attorney, Agent, or Firm* — Troutman Pepper Hamilton Sanders LLP; Ryan A. Schneider

(57) ABSTRACT

There is provided a method including: during a training period, collecting a plurality of scan cycle times of a programmable logic controller (PLC) program executing on a PLC; calculating one or more baseline parameters based on the plurality of scan cycle times; determining a baseline PLC program signature based on the one or more baseline statistical parameters; and storing the baseline PLC program signature.

61 Claims, 7 Drawing Sheets

(51) Int. Cl.
  *G06F 17/11* (2006.01)
  *G05B 11/01* (2006.01)
  *G06F 21/55* (2013.01)
  *G06F 9/4401* (2018.01)

(52) U.S. Cl.
  CPC ............ *G06F 17/11* (2013.01); *G06F 21/552* (2013.01); *H04L 63/0227* (2013.01); *G05B 2219/14065* (2013.01); *G06F 9/4401* (2013.01)

(56) References Cited

U.S. PATENT DOCUMENTS

| | | |
|---|---|---|
| 2010/0083223 A1 | 4/2010 | Chouinard et al. |
| 2010/0174387 A1 | 7/2010 | Ono et al. |
| 2012/0266022 A1 | 10/2012 | Kydles et al. |
| 2013/0031037 A1 | 1/2013 | Brandt et al. |
| 2013/0274901 A1 | 10/2013 | Chouinard |
| 2014/0165077 A1 | 6/2014 | Martinez Canedo et al. |
| 2015/0118107 A1 | 4/2015 | Sunkara et al. |
| 2015/0332283 A1* | 11/2015 | Witchey ................ G06F 21/645 705/3 |
| 2015/0346706 A1 | 12/2015 | Gendelman |
| 2018/0095441 A1* | 4/2018 | Nakagawa ............. G05B 21/02 |
| 2018/0102809 A1* | 4/2018 | Bogdanovich ....... C07D 223/26 |

OTHER PUBLICATIONS

International Search Report and Written Opinion from Application No. PCT/US2017/033756 dated Sep. 29, 2017 (19 pages).

\* cited by examiner

SYSTEMS AND METHODS FOR DETECTING ANOMALOUS SOFTWARE ON A PROGRAMMABLE LOGIC CONTROLLER

CROSS REFERENCE TO RELATED APPLICATION

This application claims priority to U.S. Provisional Patent Application No. 62/339,174 filed May 20, 2016, which is hereby incorporated by reference herein in its entirety as if fully set forth below.

TECHNICAL FIELD

Embodiments of the present disclosure relate generally to monitoring the execution of software on programmable logic controllers.

BACKGROUND

Programmable logic controllers (PLCs) are used in a variety of industrial control systems (ICSs) in critical applications including power generation, oil and gas distribution, water treatment, and manufacturing. Due to the unique environments these devices are deployed in, the primary design focus has always been on ruggedness, reliability, and real-time operations. Typically, the security of these ICSs has not been a major consideration. This lack of focus on security has left PLCs, as well as ICSs open to abuse where attacks can result in physical damage to equipment and personnel.

Recent ransomware strains have successfully targeted enterprise networks with attacks directed toward compromising a company's data. While ICS networks have so far largely avoided being targets of such cybercrime, this is not because they are inherently more secure; cybercriminals may have not yet figured out how to effectively monetize attacking ICS networks. However, in power generation, oil and gas distribution, water treatment, and manufacturing industries, cybercriminals may not find profitability in directing attacks toward compromising data, but rather by endangering the continued availability and safe operation of the facilities. As non-limiting examples, the Northeast blackout of 2003 that affected the northeastern United States was caused by a simple software bug and had an estimated economic cost of $7 to $10 billion dollars; manufacturing facilities can experience millions of dollars in lost production value for each hour of system downtime; and the monetary value of assuring utilities (e.g., water, gas, or electricity) are safely and continuously provided to households is uncertainly large. Accordingly, there exists a need to improve the security of critical ICS network applications to avoid potential security threats.

PLCs are endpoints for many ICS networks and are a vital bridge between the cyber and physical worlds. While strategies commonly used in other industries that address endpoint security, network security, and end user policies may be employed to improve security of certain critical ICS networks, there remain challenges in implementing even basic security functions in PLCs. This is because many PLCs are still sold without secure design features, may include software vulnerabilities, may lack of proper implementation of passwords, or may lack of proper message authentication. A continued lack of focus on security in PLC design coupled with practical PLC operational considerations, such as strict downtime requirements discouraging frequent patching and limited resources prohibiting strong cryptography, stand as barriers to securing PLCs through strategies commonly used in other industries.

In addition, even addressing these and other barriers to securing PLCs may still leave PLCs vulnerable to malicious attack. To date, the publicly known real-world cyber attacks on ICS networks that achieved a physical impact did not rely on insecurities of PLCs themselves, but rather reprogrammed PLCs through a compromised engineering workstation. For example, Stuxnet, a malicious computer worm that targets industrial computer systems and was responsible for causing substantial damage to Iran's nuclear program, was introduced through a compromised engineering workstation and reprogrammed PLCs with malicious control logic. Similarly, the cyber attacks causing Ukrainian power outages were not caused by zero-day exploits on circuit breaker equipment, but used a compromised workstation to send legitimate commands at inappropriate times.

A strategy for securing critical ICS networks would therefore benefit not only from commonly used security strategies, but also systems and methods for improving security defenses of each PLC that are capable of detecting potentially malicious reprogramming of the PLC.

SUMMARY

According to some embodiments, there is provided a method including: during a training period, collecting a plurality of scan cycle times of a programmable logic controller (PLC) program executing on a PLC; calculating one or more baseline parameters based on the plurality of scan cycle times; determining a baseline PLC program signature based on the one or more baseline statistical parameters; and storing the baseline PLC program signature.

The one or more baseline parameters may be derived from at least one from among statistical analysis, machine learning, or data science techniques.

Certain embodiments of some methods and systems may further include providing a proof of work function to the PLC; and receiving, from the PLC, an indication of progress of the proof of work function executed by the PLC.

The plurality of scan cycle times may be estimated based on a scan cycle counter running on the PLC.

The baseline PLC program signature may be based on a calculated scan cycle time based on known execution times for each instructions of the PLC program.

The baseline PLC program signature may include a first portion representing commonly executed program paths and a second portion representing undetected program paths, the first portion being determined based on the baseline parameters and the second portion being determined based on the calculated scan cycle time of the PLC program.

According to some embodiments, there is provided a method including: during operation of a PLC, collecting one or more scan cycle times of a PLC program executing on the PLC; comparing the one or more scan cycle times to a baseline PLC program signature; and outputting a first indicator that indicates a deviation of the PLC program operation from an expected PLC program operation based on the comparing of the one or more scan cycle times to the baseline PLC program signature.

The collecting one or more scan cycle times may include collecting one or more averages of scan cycle times.

The baseline PLC program signature may be based on at least a mean value of scan cycle times and, and the comparing the one or more scan cycle times to the baseline PLC program signature may include: calculating a cumulative difference between each of the one or more scan cycle times and the mean value; and comparing the cumulative difference to a cumulative sum threshold value.

Certain embodiments of some methods and systems may further include calculating one or more operational parameters based on the one or more scan cycle times, comparing the one or more operational parameters to one or more baseline parameters of the baseline PLC program signature, and outputting the first indicator based on the comparing the one or more operational parameters to the one or more baseline parameters.

In some embodiments, the method may further include: receiving, from the PLC, an indication of progress of a proof of work function executed by the PLC; comparing the progress of the proof of work function to an expected progress based on at least one of the one or more scan cycle times and a count of scan cycles; and outputting a second indicator that indicates a deviation of the PLC program operation from the expected PLC program operation based on the comparing the progress of the proof of work function.

In some embodiments, the method may further include transmitting the proof of work function to the PLC.

According to some embodiments, the method may further include: during operation of the PLC, collecting one or more scan cycle time verification values; comparing the one or more scan cycle time verification values to the one or more scan cycle times; and outputting a second indicator that indicates a deviation of the PLC program operation from the expected PLC program operation based on the comparing the one or more scan cycle time verification values to the one or more scan cycle times.

In some embodiments, the outputting the first indicator may include outputting an alert to a user using at least one of an e-mail, an on-screen alert, an event on a security information event monitor, and a text message.

In some embodiments the method may further include, in response to detecting a deviation of PLC program operation from an expected PLC program operation, changing a status of a network device may be changed.

The changing of the status of the network device may include at least one from among deactivating the PLC, reprogramming the PLC, transmitting a command to the PLC, and updating a firewall security policy.

According to some implementations, the method may further include determining the baseline PLC program signature may be based on a plurality of training scan cycle times of the PLC program executing on the PLC during a training period.

Determining the baseline PLC program signature may be based on a calculated scan cycle time derived from execution times for each of a plurality of instruction of the PLC program. The execution times may be known or derived.

According to some embodiments, there is provided a system including: a receiver, a transmitter, a processor, and a memory having stored thereon computer program code that, when executed by the processor, instructs the processor to: collect, during operation of a PLC and through the receiver, one or more scan cycle times of a PLC program executing on the PLC; compare the one or more scan cycle times to a baseline PLC program signature; and output, via the transmitter, a first indicator that indicates a deviation of the PLC program operation from an expected PLC program operation based on the comparing of the one or more scan cycle times to the baseline PLC program signature.

The computer program code further instructs the processor to collect the one or more scan cycle times may by collecting one or more averages of scan cycle times.

The baseline PLC program signature may be based on a mean value of scan cycle times, and the computer program code further instructs the processor to compare the one or more scan cycle times to the baseline PLC program signature by: calculating a cumulative difference between each of the one or more scan cycle times and the mean value; and comparing the cumulative difference to the cumulative sum threshold value.

The computer program code may further instruct the processor to calculate one or more operational parameters based on the one or more scan cycle times, compare the one or more operational parameters to one or more baseline parameters of the baseline PLC program signature, and output the first indicator based on the comparing the one or more operational parameters to the one or more baseline parameters.

The computer program code may further instruct the processor to: receive, from the PLC and through the receiver, an indication of progress of a proof of work function executed by the PLC; compare the progress of the proof of work function to an expected progress based on the plurality of scan cycle times; and output, via the transmitter, a second indicator that indicates a deviation of the PLC program operation from the expected PLC program operation based on the comparing the progress of the proof of work function.

The computer program code may further instruct the processor to transmit, via the transmitter, the proof of work function to the PLC.

The computer program code may further instruct the processor to collect one or more scan cycle time verification values during operation of the PLC; compare the one or more scan cycle time verification values to the one or more scan cycle times; and output, via the transmitter, a second indicator that indicates a deviation of the PLC program operation from the expected PLC program operation based on the comparing the one or more scan cycle time verification values to the one or more scan cycle times.

The computer program code may further instruct the processor transmit an alert to a user using at least one of e-mail, an on-screen alert, an event on a security information event monitor, and a text message as the first indicator that indicates a deviation of the PLC program operation from an expected PLC program operation based on the comparing of the one or more scan cycle times.

The computer program code may further instruct the processor to, in response to detecting a deviation of PLC program operation from an expected PLC program operation, change a status of a network device.

The changing the status of the network device may include at least one from among turning off the PLC, reprogramming the PLC, sending a command to the PLC, and blocking a firewall port.

The computer program code may instruct the processor to determine the baseline PLC program signature based on a plurality of training scan cycle times of the PLC program executing on the PLC during a training period.

According to some embodiments, there is provided a method including: obtaining expected execution times for each of a plurality of instructions of a programmable logic controller (PLC) program; identifying one or more branches of the PLC program, each of the one or more branches comprising a respective set of instructions; calculating, for each of the one or more branches, one or more scan cycle times of the PLC program based on the obtained expected execution times for each of the plurality of instructions and the respective set of instructions; determining a baseline PLC program signature based on the calculated one or more scan cycle times; and storing the baseline PLC program signature.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Systems and methods are described herein which relate to improving security defenses of PLCs by monitoring PLC operation. According to some embodiments, example systems and methods may gather information on a PLC as it operates (e.g., as it executes a PLC program) and compare the information from one or more scan cycles to a baseline signature, which reflects the normal operation of the PLC. According to some embodiments, example systems and methods may gather information from a plurality scan cycles, calculate operational parameters based on the information, and create an operational PLC program signature. The operational signature may be compared to a baseline signature. If a comparison indicates that the PLC is behaving abnormally, example systems and methods may notify a user of an issue or instruct the PLC to shut down or change to a fail-safe mode. Certain example systems and methods described herein leverage design features that are unique to PLCs but common among a variety of PLC models. In some cases, example methods may include analyzing scan cycle times of a PLC during operation.

PLCs may be thought of as industrialized microcontrollers controlling devices such as valves, pumps, and motors in response to operator input or preprogrammed control logic. PLCs are designed with real-time operating systems that guarantee deterministic scheduling of high priority items, and in many applications, PLCs run a constant number of processes with little to no human interaction providing consistent, repetitive scan cycles. Scan cycle times may be provided through PLC diagnostics or polled by a network device. Because high-speed computation is not required in these applications, PLC microprocessors typically have speeds (on the order of tens of MHz) slower than microprocessors used in other applications, meaning that time to complete a single instruction of a PLC program may occur within a measureable length of time. The predictability and measurability of scan cycle times make it possible to detect small changes in PLC program operation by monitoring and analyzing scan cycle times in some circumstances.

Figure 1A:
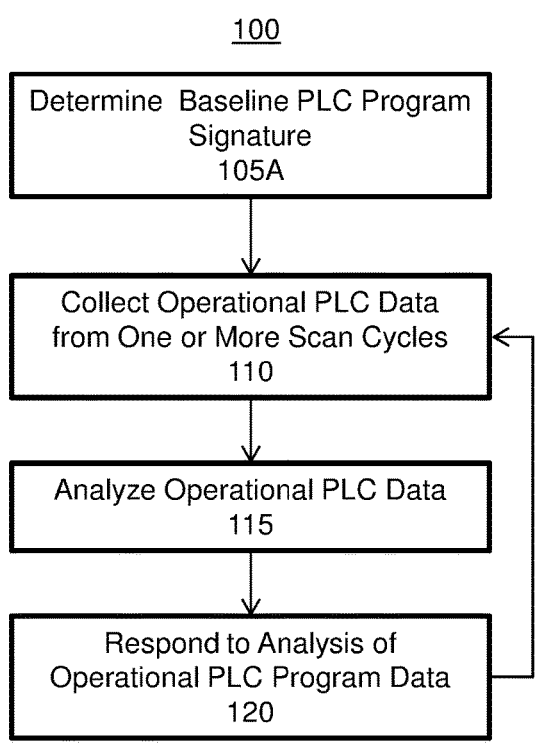
FIGS. 1A and 1B illustrate flowcharts of methods for detecting and responding to anomalous software on PLCs according to example embodiments.
Figure 1B:
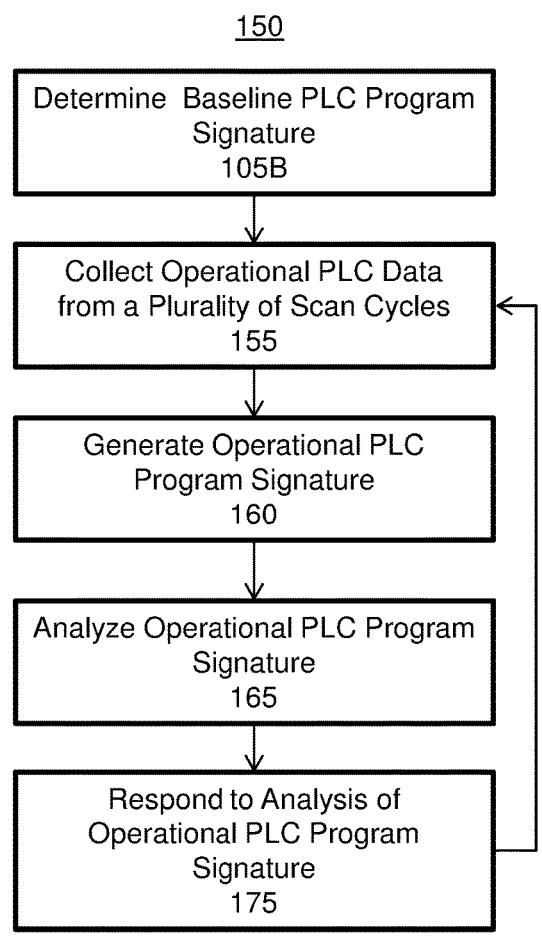

Referring to the figures, FIGS. 1A and 1B are flowcharts illustrating PLC security methods 100,150 according to example embodiments. The method 100 illustrated in FIG. 1A includes determining a baseline PLC program signature 105A, collecting operational PLC data from one scan or more cycles 110, analyzing the operational PLC data 115, and responding accordingly based on the results of the analysis of the operational PLC data 120. In some cases, the method 100 may include repeatedly or continuously collecting 110 and analyzing operational PLC data 115 and responding 120 to the analysis during operation of the PLC.

The method 150 illustrated in FIG. 1B includes determining a baseline PLC program signature 105B, collecting operational PLC data from a plurality of scan cycles 155, generating an operational PLC program signature 160, analyzing the operational PLC program signature 165, and responding to the analysis of the operational PLC program signature 175. The method 150 may include repeatedly continuously collecting data 155, generating 160 and analyzing 165 PLC program signatures, and responding 175 to the analysis during operation of the PLC. In some cases, the use of an operational PLC program signature may provide PLC program protection against more difficult to detect anomalies.

PLC Program Signature Building Blocks

PLCs may be characterized by their simple embedded hardware and real-time deterministic operating conditions. A PLC program signature may be based on elements of data that are collected from the PLC or measured during PLC operation. In certain embodiments, a baseline PLC program signature may be an indicator of intended (e.g. normal, expected) operation of a PLC program. In certain embodiments, the PLC program signature may be based at least in part on information collected during scan cycles of an executing PLC program. In some embodiments, the PLC program signature may be developed using one or more statistical analysis, machine learning, or histograms of one or more pieces of information collected (e.g., scan cycle times, processor load, memory utilization, etc.) during the scan cycles.

Figure 2:
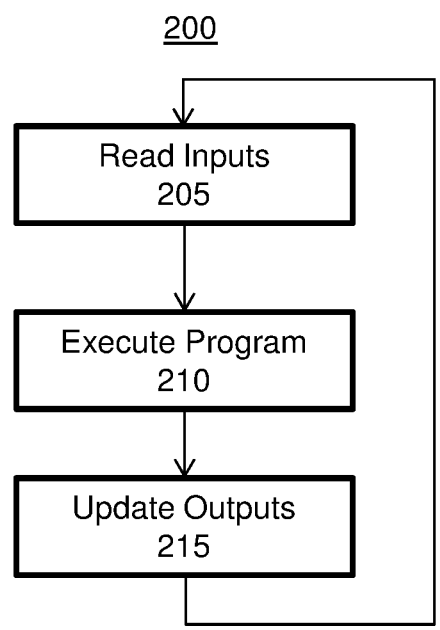
FIG. 2 illustrates the scan cycle of an example PLC.

FIG. 2 depicts a scan cycle 200 of an example PLC. During the scan cycle, the PLC reads physical inputs 205, executes a program 210, and updates physical outputs 215 based on the PLC program logic. In some cases, the scan cycle 200 may be executed constantly or near constantly (i.e., a next scan cycle begins immediately or shortly after completion of a current scan cycle). During execution of a scan cycle 200, various data may be collected (e.g., scan cycle time, processor load information). As will be appreciated an understood, some PLC models may report scan cycle times that include an additional step of performing system functions such as network communication (not shown) following the updating of physical outputs 215.

The scan cycle time (i.e. the time between the start and end of scan cycles 200), is affected by the size and complexity of the PLC program, where bigger programs have longer running times and programs with more complex control flow have scan times with higher variance. In some embodiments, the scan cycle time can be utilized as an indicator of proper PLC operation. In certain PLCs, the scan cycle time is made available for reporting or diagnostic purposes. In some PLCs, the scan cycle time must be collected by other means.

Figure 3:
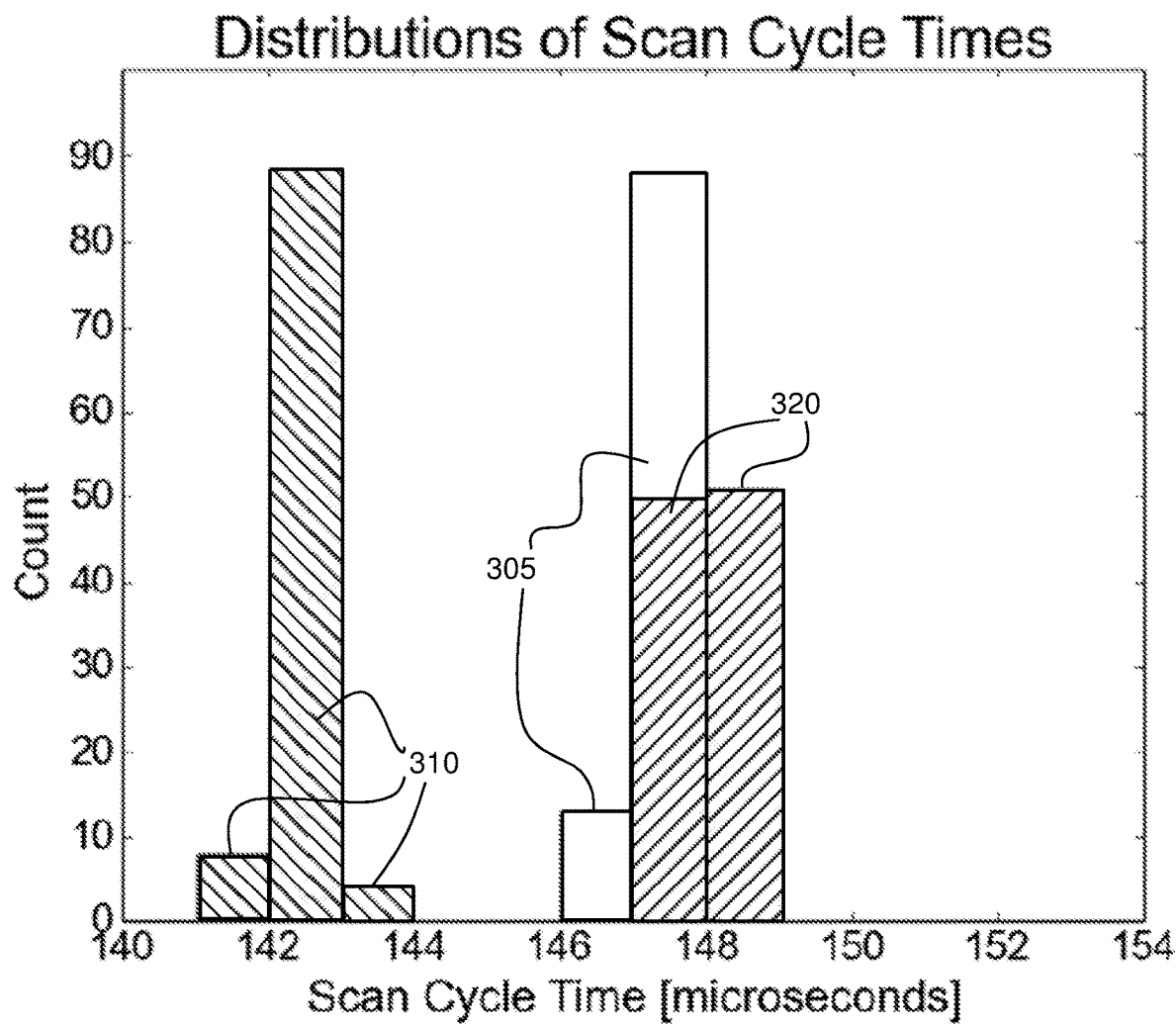
FIG. 3 depicts example distributions of scan cycle times for three different example PLC programs after 100 cycles.

FIG. 3 illustrates by way of example, a distribution of scan cycle times after 100 cycles for a simple program 305 (white bars), the simple program modified such that control actions are skipped 310 (left dashed bars), and the simple program modified such that extra code is executed 320 (right dashes bars). As shown in FIG. 3, modifications to the simple program result in cycle time distributions that differ from the scan cycle time distribution of the original simple program. In some embodiments, the scan cycle time can be used as a building block of a PLC program signature. In some cases, the PLC program signature of the original PLC program may be discernible from a signature produced by programming that has been modified.

The building blocks of the PLC program signature may be determined based on factors such as the desired level of protection and acceptable levels of invasiveness in the PLC. By way of example and not limitation, a possible implementation of minimal invasiveness and weaker protection against malicious changes may utilize a PLC signature applied directly to the original program, wherein the baseline PLC signature is derived from individual scan cycle times. The individual scan cycle times may be characterized by parameters obtained from statistical measurements including distributions, means, and variances, or machine learning algorithms such as neural networks or support vector machines. In such an implementation, changes to the original program would be indicated when a scan cycle time observed during operation falls outside of an acceptable range. In some implementations, (e.g., referring back to FIG. 1A), the operational PLC data collected 110 may include or consist of the scan cycle time, and analysis of the scan cycle time 115 may include a comparison with the baseline PLC signature, for example, by comparison with statistical measurements, machine learning algorithms, or other baseline parameters derived from a baseline PLC signature.

Such an implementation may be more suited to detecting accidental program changes (e.g., errors) rather than malicious changes (e.g., attacks). An intelligent adversary might perform an attack that only executes malicious code periodically to reduce the impact on the operational signature, executes malicious code that matches the original distribution close enough to avoid detection, or modifies the PLC to report cycle times that match the original distribution.

In some cases, signature complexity may be increased by deriving the baseline and operational signatures from more information rather than individual scan cycle measurements or by performing calculations on operational PLC data from a plurality of scan cycles to generate an operational PLC program signature. For example, CPU load information, such as commonly available from PLCs, or values from multiple consecutive scan cycles (e.g., how scan cycle times change), may be used to derive a baseline or operational PLC program signature. Counters may also be implemented to count how many times a program has executed within a given period of time. In some cases, such methods may be implemented without modification of the original PLC program, and therefore would be considered minimally invasive.

By way of example, referring to the method 150 illustrated in FIG. 1B, multiple individual scan cycle times may be collected during operation of the PLC 155. An operational PLC program signature may be generated 160 using one or more statistical analysis or measurements, machine learning, neural networks, support vectors, or histograms of one or more pieces of information collected (e.g., scan cycle times, processor load, memory utilization, etc.) during the scan cycles. The statistical measurements may include, as non-limiting examples, a mean, median, variance, skew, and distribution curve. Analysis of the operational PLC program signature 165 may, for example, involve a comparison of the operational PLC program signature to the baseline PLC program signature.

A more invasive method of increasing signature complexity would involve increasing the complexity of the PLC program itself. One approach for this method of enhancing security would include implementing a type of proof of work function in the PLC program that takes an unpredictable but deterministic amount of time to complete. In such an implementation, a network administrator would be able to send challenges to the PLC, and run the efficient verification check on the answer.

By taking advantage of the limited quantity of RAM, slower processor speeds, and deterministic real-time operating systems of a PLC, proof of work functions may be used to provide an upper bound guarantee that the PLC is not executing additional instructions in the background. Proof of work functions may be implemented in PLCs by counting scan cycles (or scan cycle times) and polling the progress of the proof of work calculation. Due to the nature of proof of work functions, an attacker cannot skip steps in the proof of work function and add scan cycles to the count. An attacker attempting to modify a PLC program including a proof of work function would necessarily have to execute each step of the proof of work function while still keeping the execution time of the program consistent with baseline PLC program signature building blocks based on scan cycle time data. Thus, even if a PLC was compromised to report false operational scan cycle counts or times, the progress of the work function could not be easily spoofed.

A specific example of a possible proof of work function that may be implemented as a building block of a PLC program signature is the discrete logarithm problem, which under certain conditions has no known efficient algorithm to solve. In an example implementation, discrete logarithm problems could be sent to the PLC and the PLC would respond with the answer while still reporting scan cycle times. In some embodiments, proof of work functions could include challenges that verify contents of memory or implementations of message authentication code (MAC) algorithms.

One benefit of the proof of work function is that it verifies that the scan cycle count and scan cycle times being collected from the PLC are not being spoofed by an attacker. As will be appreciated and understood by one of ordinary skill, alternative or additional systems and methods to check the reliability of PLC scan cycle counts or scan cycle times may be implemented through hardware or firmware.

Determine Baseline PLC Program Signature

A PLC program may have one or more signatures that are characterized by building blocks as described above. Referring back to the example methods 100,150 illustrated in FIGS. 1A and 1B, once it is understood how a PLC program signature is constructed, one or more baseline signatures for a given PLC program can be determined 105A,105B; wherein each baseline PLC program signature is an indicator of the intended (e.g., normal or expected) operation of the PLC program. By way of example and not limitation, three examples of methods for determining a baseline PLC program signature are described herein: a black box method, a white box method and a gray box method.

The black box method does not require any foreknowledge of the PLC program code or application. By way of an example implementation of the black box method, a baseline PLC program signature may be based on data collected from the PLC during operation of the PLC during a training period where there is high confidence that the PLC has not been compromised and is operating as intended. In some cases, the training period may be conducted in a clean environment (e.g., experimentally before the PLC is installed), or may be performed in the PLC in an operational environment (e.g., after the PLC is installed for use). For example, a baseline PLC program signature may be based on scan cycle times or additional data such as processor loads collected from the PLC during the training period. In certain implementations, PLCs may follow the same or similar logic path for each execution of a scan cycle, and rarely executing jump statements to different logic paths. Jump statements may be used to change the mode of operation, for example to a maintenance mode or fault detection mode, resulting in significantly different scan cycle times. Unless such branches are executed during the training period, a baseline PLC program signature determined by the black box method will not include a characterization of the branches.

The white box method may be utilized when the PLC program code is known. In some cases, expected run times for given operations on the PLC may be known (e.g., disclosed in PLC user's manuals) or may be determined through experimentation. If the PLC program code is known, scan cycle times can be calculated based on the sum of the expected run times for each operation of the program code. Theoretically, a baseline PLC program signature could be determined entirely through white box methods. However, the accuracy baseline PLC program signatures is dependent on the accuracy of the data on which they are based, and thus may not be as accurate as baseline PLC program signatures determined through black box methods.

The gray box method is a strategy that utilizes both the white box and black box methods, leveraging the advantages of each. Compared to the white box method, a baseline PLC program signature that is determined based on the black box method may more accurately represent typical operation of the PLC program; however, a baseline PLC program signature that is determined based on the black box method may not capture intended PLC program functions that are performed infrequently or have yet to be performed. Black box methods also rely on a training period, during which time there is high confidence that the PLC program is operating as intended and has not been compromised, whereas white box methods may potentially be established before the PLC program is implemented. Therefore the gray box method may produce baseline PLC program signatures that are formulated based on black box methods for repetitive common operation and baseline PLC program signatures that are formulated based on white box methods for branch conditions. Baseline PLC program signatures that are formulated based on white box methods may also be used as a check to verify the reliability of data collected during the training period.

Collect Operational PLC Data and Generate an Operational PLC Program Signature

Figure 4:
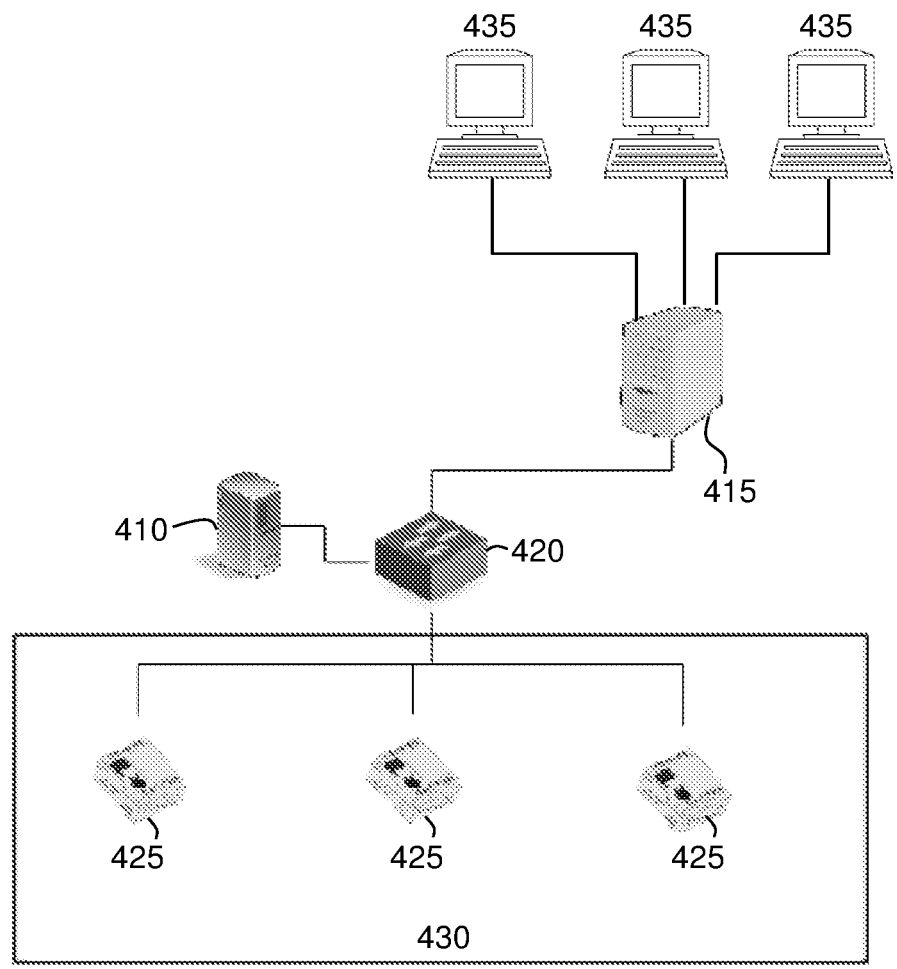
FIG. 4 depicts an example of networked components for controlling and monitoring a process control network.

During operation of the PLC, data may be collected for the purposes of comparing the operation of the PLC to expected operation. PLC scan cycle times (or other information) being reported over a network, either through polling or spontaneous messages may be collected by a device on the network. FIG. 4 illustrates an example of a hypothetical network that includes PLCs 425 within a process control network 430 that are connected to a network switch 420. A network monitor 410 and a master control device 415 in communication with engineering workstations 435 are connected to the network switch 420. By way of example and not limitation, the master control device 415 may receive measurements from one or more of the PLCs 425 (e.g., through either polling or spontaneous messaging). By way of example and not limitation, the network monitor 410 may passively observe operation PLC measurement data received by the master control device 415 and, if necessary, generate operational PLC program signatures. By way of example and not limitation, sensors (not shown in FIG. 4) may also or alternatively collect operational PLC data and pass that information to the network monitor 410. In some embodiments, the master control device 415 may generate the operational PLC program signatures, and a separate network monitor 410 may not be included in the network. In some circumstances, the data collected during operation of the PLC (e.g., scan cycle times) may be used to generate an operational PLC signature, for example, using same or similar operations as those used to generate a baseline PLC signature (see, e.g., 105A,105B of FIGS. 1A and 1B).

As will be appreciated and understood, PLC scan cycle times may be collected as described above during a training period and any of the systems and methods capable of generating an operational PLC program signature may also be used to during the training period to determine a baseline PLC program signature. In certain embodiments, the PLC program signature may be based at least in part on information collected during execution of scan cycles such as scan cycle times, CPU load information, or proof of work functions.

Analyze Operational PLC Data or Program Signature

Referring to example methods 100,150 illustrated in FIGS. 1A and 1B, once operational PLC data is collected 110 or an operational PLC program signature is generated 160, the operational data or the operational signature may be analyzed 115,165. By way of example and not limitation, analysis 115,165 may be performed by a trusted network device such as a network monitor 410 or a master control device 415. Analysis 115,165 may be performed by the same device that collects the PLC measurements or data, the device that generates the operational PLC program signature (e.g., the network monitor 410 or the master control device 415), or some third device.

By way of example and not limitation, the analysis of the operational PLC data 115 may be based on data collected from one or more scan cycles compared to the baseline PLC program signature (e.g., as compared to parameters extracted from the baseline PLC program signature). By way of example and not limitation, the analysis of an operational PLC program signature 165 may be based in part on a comparison of one or more operational PLC program signatures to one or more baseline PLC program signatures. Given the example above wherein the baseline signature is generated during a training period, once the baseline signature is determined, the trusted network device may continue to collect operational PLC data or program signatures and compare to one or more baseline PLC program signatures. Comparisons to the one or more baseline PLC program signatures may use statistical methods or machine learning classification, for example.

The analysis of the operational PLC data or program signature may provide data to indicate the likelihood that the PLC program is operating as intended. For example, the analysis may provide a binary indication, indicating whether or not the operational PLC data or program signature is within an acceptable range of the baseline PLC program signature. If the operational PLC data or program signature deviates from the baseline PLC program signature, the analysis may provide information on the nature of the deviation such as the severity of deviation of the operational PLC data from the baseline PLC program signature or which building blocks of the operational PLC program signature differ from those of the baseline PLC program signature and to what degree.

Respond to Analysis of Operational PLC Program Signature

Referring to the example methods 100,150 illustrated in FIGS. 1A and 1B, after the analysis of the operational PLC data 115 or operational PLC program signature 165 is complete, a network device may respond to the analysis 115,165 to address indications of software anomalous behavior (e.g., misbehavior) in the PLC. By way of example and not limitation, response strategies may be passive or active.

Passive responses may include notification of a user. For example, the system may send an e-mail to the user, provide a message on the screen of an engineering workstation 435, or create an event on a security information event monitor (SIEM). The user could then take appropriate action based on the information of the notification. Active responses may include an action performed automatically by a network device. The network device could, for example, shut down the PLC, updating a firewall security policy (e.g., blocking or closing a firewall port), or reprogram the PLC. In some cases, the network device could control the PLC to enter a safe or default mode.

Example Experimental Implementations

For the sake of demonstrating a possible implementation of example embodiments, assumptions are made about the nature of potential threats and operation of the PLC. Such assumptions are non-limiting, and as will be appreciated and understood, systems and methods of the present disclosure may be applicable to alternative scenarios.

By way of example and not limitation, the following example implementations address a threat model considering adversaries of varying skill levels attempting to maliciously reprogram a PLC at the user application layer. This threat model mirrors historical attacks on PLCs and may be a feasible scenario for an attempted attack. In some experiments, the addressed threat model assumes an attack at the application layer. Accordingly, anomalous activity originating from both network-based attacks and local attacks (e.g., from a local programming port) are equally detectable. In some embodiments and implementations the accuracy and effectiveness of the anomaly detection are the same regardless of whether the PLC is compromised over a network (which may be detected using alternative approaches) or via a local programming port.

The threat model assumes the attacker can observe all traffic and scan cycle times being sent over the network and has full knowledge of the proposed detection methods. Because the threat model assumes that the attacker is only modifying the user application layer, the diagnostic information coming from the underlying system can only be indirectly modified by shaping the control program.

For the purposes of demonstration of hypothetical implementations of example embodiments, four models of PLC devices from three of the most popular PLC vendors were each tested while running four programs of varying end-use applications. The four programs are of similar complexity, including only hundreds of instructions.

Table 1 lists the PLC models, the memory available for user programs for each model, and the resolution of scan cycle times provided by PLC system diagnostics. The application memory may limit an adversary's ability to pre-compute and store proof-of-work results, and the cycle time resolution may limit how small of a change can be detected in a single scan cycle time.

TABLE 1

Overview of PLC Devices and System Information

| PLC Model | Application Memory | Cycle Resolution |
| --- | --- | --- |
| MicroLogix 1100 | 8 KB | 100 µs |
| Siemens S7-1200 | 75 KB | 1 ms |
| Schneider M221 | 256 KB | 1 µs |
| Schneider M241 | 8 MB | 1 µs |

Four often-viewed programs sampled from the "Mr. PLC" forum website were used to demonstrate hypothetical implementations of example embodiments. Table 2 includes a general description of the programs and the complexity of the programs as expressed in number of instructions and number of data words according to execution by the MicroLogix 1100.

TABLE 2

Complexity of Programs Tested

| Program | Description | Instructions | Data Words |
| --- | --- | --- | --- |
| P1 | Motor Starter | 553 | 1068 |
| P2 | Sequencer Example | 365 | 160 |
| P3 | Bottling Plant | 419 | 433 |
| P4 | Conveyor Belt | 615 | 425 |

Each of the four programs were written for all of the four PLCs and operated during a training period to establish baseline PLC program signatures. The four programs include common instructions such as timer blocks, counter blocks, examine if closed (XIC), and move operations. Additionally, the example programs were modified by adding the smallest amount of instructions possible for an attacker to implement a logic bomb in different ways. Modifications include the addition of a timer, a counter, a single compare operation, and a single XIC instruction. For all experiments, unless otherwise noted, a total of 10,000 scan cycle samples were taken at a rate of 10 samples per second over a 16 minute duration.

Baseline PLC program signatures for each program on each PLC were established by executing a number of experiments (between 6 and 10 experiments) for each program on each PLC. In this example implementation, baseline PLC program signatures were characterized by the mean and standard deviation of scan cycle times for each experiment. The mean and standard deviation for each experiment of scan cycle times was calculated and plotted as shown in FIGS. 5-8.

Figure 5:
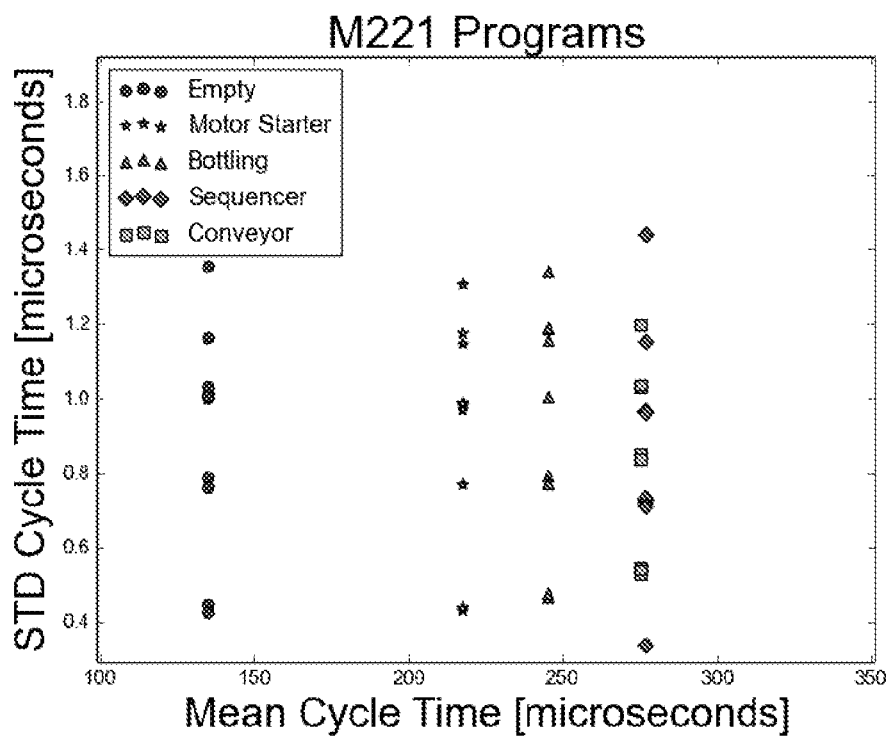
FIGS. 5-8 are plot graphs illustrating average scan cycle times and deviations for a various PLC models according to example implementations.

FIG. 5 is a plotted graph of the mean and standard deviation of scan cycle times for the M221, having a system resolution of the scan cycle time given in microseconds. As depicted in FIG. 5, all programs exhibited similar ranges of standard deviations in scan cycle times, but exhibited consistent differences in mean execution times. Even the two closest programs, the conveyor belt and sequencer example, consistently had more than 2 s difference in mean execution times. The M241 also provides microsecond level precision for scan cycle measurements and exhibited even clearer differences between baseline signatures.

Figure 6:
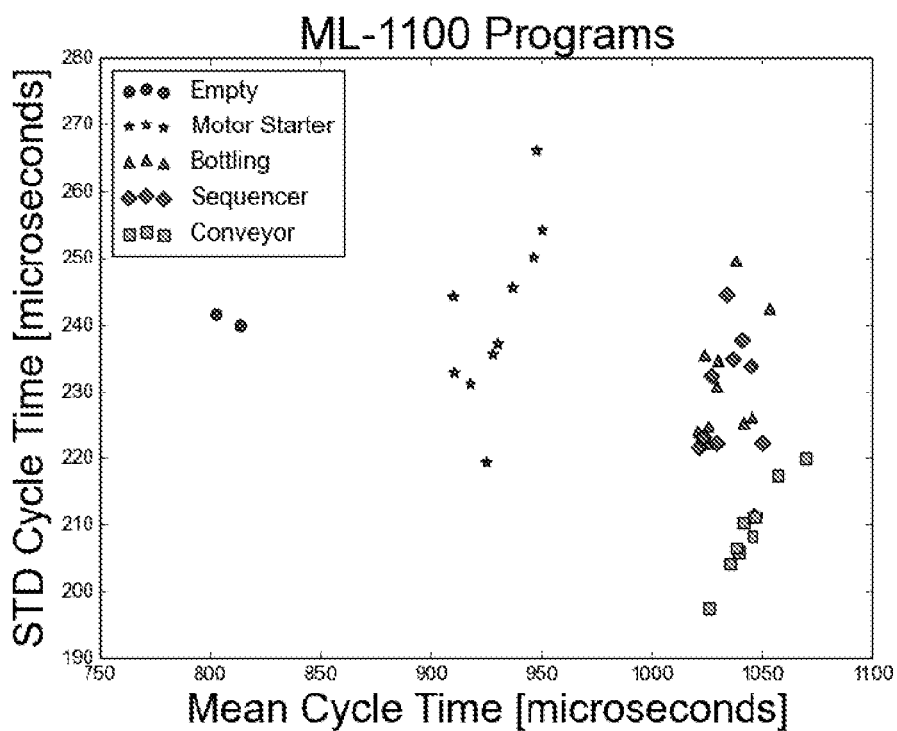

The MicroLogix 1100 provided a 100 µs diagnostic scan cycle time resolution. As seen in FIG. 6, this results in signature overlap, particularly for the Bottling Plant, Sequencer Example, and Conveyor Belt programs as a result of the lower scan cycle time resolution. Meanwhile, the Siemens S7-1200 provides a diagnostic scan cycle time resolution of 1 ms. Since none of the four program execution times exceeded a mean time of 1 ms on the Siemens S7-1200 PLC, there was no discernible difference in baseline PLC program signatures for the Siemens S7-1200.

However, as discussed above, in some cases limitations of low resolution scan cycle times may be resolved through modification of the PLC control program. In some applications, PLC programs are executed with minimal to no time gaps between scan cycles; therefore, an average scan cycle time can be extracted by measuring the number of scan cycle loops executed over a known period of time, which may be accomplished by modifying the PLC program to include a counter. By way of example, and not limitation, the PLC program may be configured report the count over an ICS protocol already being used, such as Modbus, or through a new protocol. A network device generating a PLC program signature may calculate the average scan cycle time based on the elapsed time and the scan cycle count.

Figure 7:
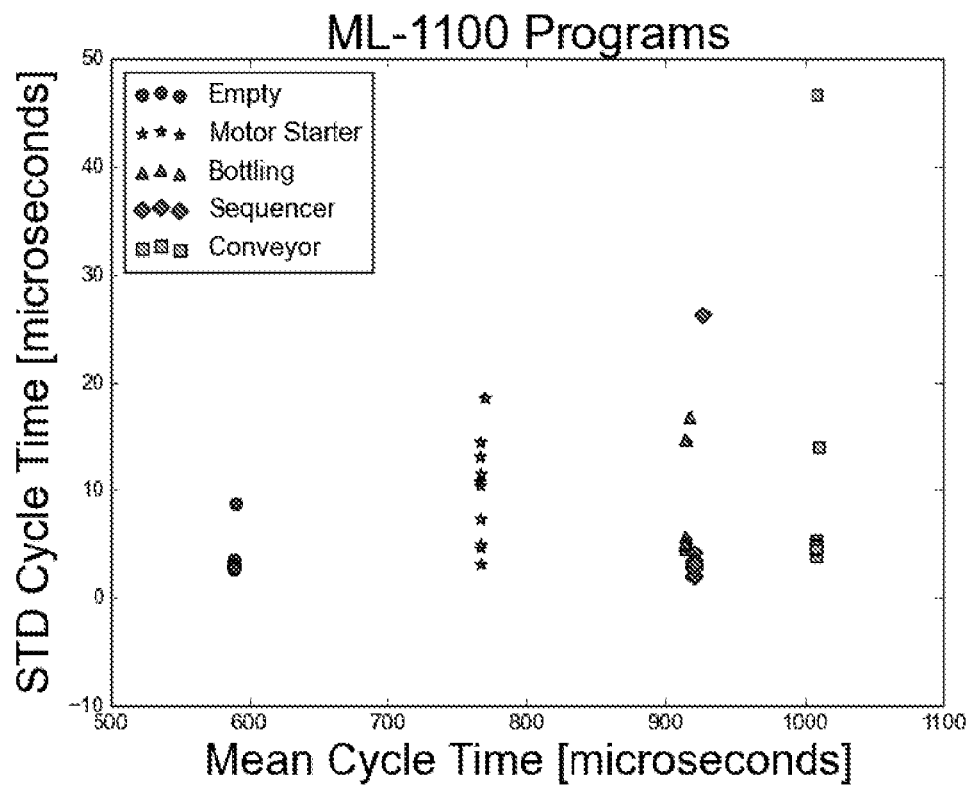
Figure 8:
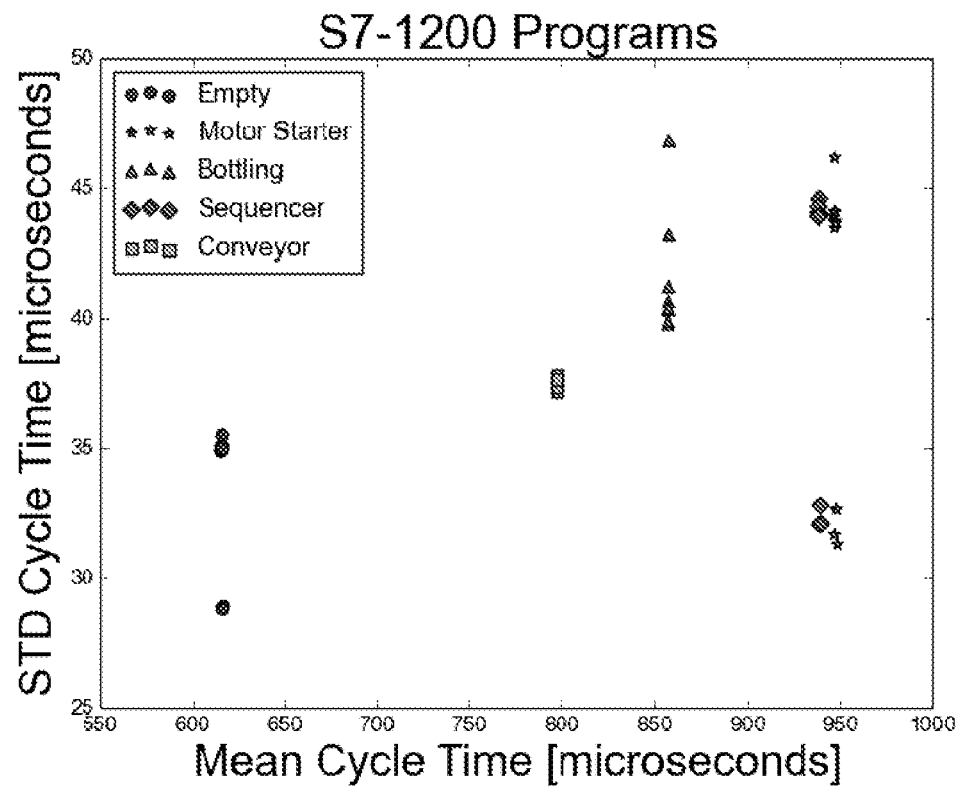

For the purpose of demonstration, each program on the MicroLogix 1100 and Siemens S7-1200 was modified to include a counter and the mean and standard deviation for each modified program was calculated and plotted as shown in FIG. 7 for the MicroLogix 1100 and FIG. 8 for the Siemens S7-1200. Comparing FIG. 6 and FIG. 7, programs ran on the MicroLogix 1100 illustrates that the baseline PLC program signatures generated based on available diagnostic scan cycle times (FIG. 6) are clearly discernible when a counter is utilized to provide average scan cycle times (FIG. 7). Even though the Bottling Plant and Sequencer Example programs appear close in FIG. 7, there is consistently more than 3 µs difference in their execution times on the MicroLogix 1100. Even though the 1 ms resolution provided no information for classifying programs on the Siemens S7-1200, implementing a counter provides clear differences in baseline PLC program signatures as shown in FIG. 8.

For the purposes of demonstration, baseline PLC program signatures were based on data collected through a training period consisting of half of the data taken during experiments using the original PLC program, and the other half of the data taken during experiments using the original PLC program plus 10,000 samples each of four different modifications to the original programs were representative of PLC operation. The four program modifications were inclusion of a single timer, inclusion of a single counter, inclusion of a single comparison statement, and inclusion of a single examine if closed (XIC) instruction. The additional code represents a hypothetical attack scenario wherein an attacker adds a minimal amount of code to insert a logic bomb in the PLC program.

For the purposes of demonstration, a standard cumulative sum (CUSUM) method was applied to the scan times of the data collected through the training period to provide further definition of baseline PLC program signatures and the CUSUM method was applied to the remaining scan times characterizing PLC operation. The CUSUM method operates by cumulatively adding the difference between a variable and its known mean over time. The CUSUM algorithm indicates a change has occurred when the cumulative sum passes a certain threshold.

A false positive rate is defined as the ratio of the number of times a sample is incorrectly classified as a modified program over the number of samples from the original program sample set. A true positive rate is defined as the ratio of the number of samples correctly classified as a modified program over the total number of samples from the modified program sample set. CUSUM thresholds were adjusted and the false positive rate and the true positive rate was calculated for a given PLC and program. For the MicroLogix 1100 an inflection point for the tradeoff between true positive rate vs. false positive rate occurred around a true positive rate of 99.8% and a false positive rate of 0.025% for each program, which with a sampling rate of 10 samples per second corresponds to 9 false alarms per day.

In some implementations, a CUSUM threshold may be incorporated into the baseline PLC program signature. In some embodiments, the CUSUM threshold may be calculate based on, for example, one or more of a mean or variance of the scan cycles times.

For the purposes of illustration, consider a discrete logarithm problem proof of work function executed on the MicroLogix 1100. The underlying theory of the discrete logarithm program is that given proper choices of large prime p and g that is a primitive root modulo p, there is no efficient method to solve for the integer k in the equation $g^k$ mod p=b where b is a member of the multiplicative group of integers modulo p or $b \in Z^*_p$. In one example implementation, the value of p may be stored with 10 bits, and the value of q may be stored with 12 bits. In some implementations, the values for p and q may be chosen to minimize impact on the computational load of the MicroLogix 1100, to function within the limitations of the microprocessor's ability to perform mathematical operations on large numbers, to provide a large enough group size so that the computational results could not be easily guessed, and to provide a problem with a large enough set of steps such that an attacker would not be able to pre-compute results and store the results in the memory of the MicroLogix 1100 without reducing the size of the original program. As will be appreciated and understood, the size of p and q could be adjusted for different PLC architectures, for example, based on the PLC's microprocessor's ability to operate on numbers with more or fewer bits or the PLC's memory size. The PLC program may be modified such that, during execution of a scan cycle, the MicroLogix 1100 completes one step toward solving the proof of work function.

In experiments, the discrete logarithm problem proof of work function implemented as described above resulted in a true positive detection rate of 98.5% with an average detection time of 25 samples (2.5 seconds) after modification of the original program by the four program modifications described above (timer blocks, counter blocks, examine if closed (XIC), and move operations). The experimental implementations also resulted in zero false positives. Thus, as demonstrated, a proof of work function may be implemented as an effective means to detect small modifications to a PLC program and detect potentially malicious program modifications.

Illustrative Computer System Architecture

Figure 9:
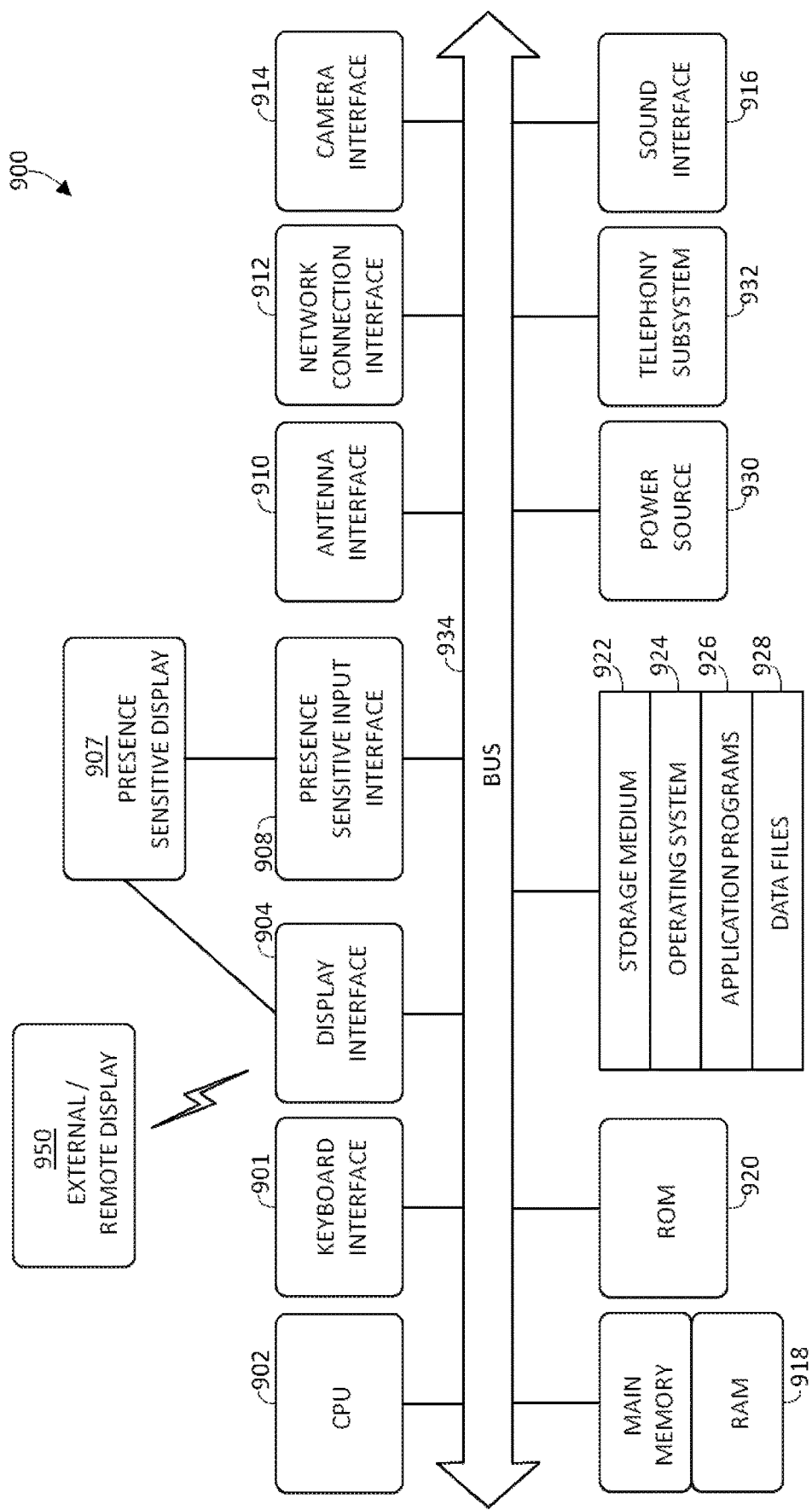
FIG. 9 is a block diagram of an illustrative computer system architecture, according to an example embodiment.

As desired, implementations of the disclosed technology may include a computing device with more or less of the components illustrated in FIG. 9. It will be understood that the computing device architecture 900 is provided for example purposes only and does not limit the scope of the various implementations of the present disclosed systems, methods, and computer-readable mediums.

The computing device architecture 900 of FIG. 9 includes a central processing unit (CPU) 902, where computer instructions are processed, and a display interface 904 that acts as a communication interface and provides functions for rendering video, graphics, images, and texts on the display. In certain example implementations of the disclosed technology, the display interface 904 may be directly connected to a local display, such as a touch-screen display associated with a mobile computing device. In another example implementation, the display interface 904 may be configured for providing data, images, and other information for an external/remote display 950 that is not necessarily physically connected to the mobile computing device. For example, a desktop monitor may be utilized for mirroring graphics and other information that is presented on a mobile computing device. In certain example implementations, the display interface 904 may wirelessly communicate, for example, via a Wi-Fi channel or other available network connection interface 912 to the external/remote display 950.

In an example implementation, the network connection interface 912 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 904 may be operatively coupled to a local display, such as a touch-screen display associated with a mobile device. In another example, the display interface 904 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 904 may wirelessly communicate, for example, via the network connection interface 912 such as a Wi-Fi transceiver to the external/remote display 950.

The computing device architecture 900 may include a keyboard interface 901 that provides a communication interface to a keyboard. In one example implementation, the computing device architecture 900 may include a presence-sensitive display interface 908 for connecting to a presence-sensitive display 907. According to certain example implementations of the disclosed technology, the presence-sensitive display interface 908 may provide a communication interface to various devices such as a pointing device, a touch screen, a depth camera, etc. which may or may not be associated with a display.

The computing device architecture 900 may be configured to use an input device via one or more of input/output interfaces (for example, the keyboard interface 901, the display interface 904, the presence sensitive display interface 908, network connection interface 912, camera interface 914, sound interface 916, etc.) to allow a user to capture information into the computing device architecture 900. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 900 or may be a separate device. For example, the input device may be an accelerometer, a magnetometer, a digital camera, a microphone, and an optical sensor.

Example implementations of the computing device architecture 900 may include an antenna interface 910 that provides a communication interface to an antenna; a network connection interface 912 that provides a communication interface to a network. As mentioned above, the display interface 904 may be in communication with the network connection interface 912, for example, to provide information for display on a remote display that is not directly connected or attached to the system. In certain implementations, a camera interface 914 is provided that acts as a communication interface and provides functions for capturing digital images from a camera. In certain implementations, a sound interface 916 is provided as a communication interface for converting sound into electrical signals using a microphone and for converting electrical signals into sound using a speaker. According to example implementations, a random access memory (RAM) 918 is provided, where computer instructions and data may be stored in a volatile memory device for processing by the CPU 902.

According to an example implementation, the computing device architecture 900 includes a read-only memory (ROM) 920 where invariant low-level system code or data for basic system functions such as basic input and output (I/O), startup, or reception of keystrokes from a keyboard are stored in a non-volatile memory device. According to an example implementation, the computing device architecture 900 includes a storage medium 922 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 924, application programs 926 (including, for example, a web browser application, a widget or gadget engine, and or other applications, as necessary) and data files 928 are stored. According to an example implementation, the computing device architecture 900 includes a power source 930 that provides an appropriate alternating current (AC) or direct current (DC) to power components.

According to an example implementation, the computing device architecture 900 includes and a telephony subsystem 932 that allows the device 900 to transmit and receive sound over a telephone network. The constituent devices and the CPU 902 communicate with each other over a bus 934.

According to an example implementation, the CPU 902 has appropriate structure to be a computer processor. In one arrangement, the CPU 902 may include more than one processing unit. The RAM 918 interfaces with the computer bus 934 to provide quick RAM storage to the CPU 902 during the execution of software programs such as the operating system application programs, and device drivers. More specifically, the CPU 902 loads computer-executable process steps from the storage medium 922 or other media into a field of the RAM 918 in order to execute software programs. Data may be stored in the RAM 918, where the data may be accessed by the computer CPU 902 during execution. In one example configuration, the device architecture 900 includes at least 128 MB of RAM, and 256 MB of flash memory.

The storage medium 922 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro- DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 922, which may include a machine-readable storage medium.

According to one example implementation, the term computing device, as used herein, may be a CPU, or conceptualized as a CPU (for example, the CPU 902 of FIG. 9). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

The present disclosure can be understood more readily by reference to the above detailed description and figures of one or more example embodiments and the examples included herein. It is to be understood that embodiments are not limited to the example embodiments described within this disclosure. Numerous modifications and variations therein will be apparent to those skilled in the art and remain within the scope of the disclosure. It is also to be understood that the terminology used herein is for describing specific example embodiments only and is not intended to be limiting. It is intended that each term contemplates its broadest meaning as understood by those skilled in the art and includes all technical equivalents that operate in a similar manner to accomplish a similar purpose. Some example embodiments of the disclosed technology were described more fully with reference to the accompanying drawings. The disclosed technology might, however, be embodied in many different forms and should not be construed as limited to the example embodiments set forth herein.

In the above description, numerous specific details are set forth. However, it is to be understood that embodiments of the disclosed technology may be practiced without these specific details. In other instances, well-known methods, structures, and techniques have not been shown in detail in order to avoid obscuring an understanding of this description. References to "one embodiment," "an embodiment," "example embodiment," "some embodiments," "certain embodiments," "various embodiments," etc., indicate that the example embodiment(s) of the disclosed technology so described may include a particular feature, structure, or characteristic, but not that every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicates that different instances of like objects are being referred to, and are not intended to imply that the objects so described must be in a given sequence, either temporally, spatially, in ranking, or in any other manner.

The materials described herein as making up the various elements of the example embodiments of the present disclosure are intended to be illustrative only and not restrictive. Many suitable materials that would perform a same or a similar function as the materials described herein are intended to be embraced within the scope of the example embodiments. Such other materials not described herein can include, but are not limited to, materials that are developed after the time of the development of the invention.

While certain embodiments of the disclosed technology have been described in connection with certain embodiments, it is to be understood that the disclosed technology is not to be limited to the disclosed embodiments, but on the contrary, is intended to cover various modifications and equivalent arrangements included within the scope of the appended claims and their equivalents. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. Certain other examples that may occur to those skilled in the art are intended to be within the scope of the claims if they have structural elements that do not differ from the literal language of the claims, or if they include equivalent structural elements with insubstantial differences from the literal language of the claims.

What is claimed is:

1. A method comprising:
during a training period, collecting one or more scan cycle times of a programmable logic controller (PLC) program executing on a PLC;
calculating one or more baseline parameters based on one or more of the collected scan cycle times;
determining a baseline PLC program signature comprising:
a first portion representing commonly executed program paths and determined based on one or more of the calculated baseline parameters; and
a second portion representing undetected program paths and determined based on one or more of the collected scan cycle times of the PLC program; and
storing the baseline PLC program signature.

2. The method of claim 1, wherein one or more of the calculated baseline parameters are derived from at least one from among statistical analysis, machine learning, or data science techniques.

3. The method of claim 1 further comprising:
providing a proof of work function to the PLC; and
receiving, from the PLC, an indication of progress of the proof of work function executed by the PLC.

4. The method of claim 1, wherein the collected scan cycle times are estimated based on a scan cycle counter running on the PLC.

5. The method of claim 1, wherein the baseline PLC program signature is further based on a calculated scan cycle time based on known execution times for one or more instructions of the PLC program.

6. A method comprising:
during operation of a programmable logic controller (PLC), collecting a first set of one or more scan cycle times of a PLC program executing on the PLC;
comparing one or more of the collected scan cycle times to a baseline PLC program signature based on at least a mean value of a second set of scan cycle times, wherein comparing comprises:
calculating a cumulative difference between one or more of the collected scan cycle times and the mean value; and
comparing the cumulative difference to a cumulative sum threshold value; and
outputting a first indicator that indicates a deviation of the PLC program operation from an expected PLC program operation based on the comparing.

7. The method of claim 6, wherein one or more of the collected scan cycle times comprises one or more averages of two or more of the collected scan cycle times.

8. The method of claim 6, wherein:
comparing one or more of the collected scan cycle times comprises comparing each of the one or more collected scan cycle times to the baseline PLC program signature; and
calculating the cumulative difference comprises calculating the cumulative difference between each of the one or more collected scan cycle times and the mean value.

9. The method of claim 6 further comprising calculating one or more operational parameters based on one or more of the collected scan cycle times;
wherein comparing one or more of the collected scan cycle times comprises comparing one or more of the operational parameters to one or more baseline parameters of the baseline PLC program signature; and
wherein outputting the first indicator is based on comparing one or more of the operational parameters to one or more of the baseline parameters.

10. The method of claim 6, wherein outputting the first indicator comprises outputting an alert to a user using an output selected from the group consisting of e-mail, an on-screen alert, an event on a security information event monitor, and a text message.

11. The method of claim 6 further comprising, in response to the first indicator detecting the deviation of PLC program operation from the expected PLC program operation, changing a status of a network device.

12. The method of claim 11, wherein changing the status of the network device is selected from the group consisting of deactivating the PLC, reprogramming the PLC, transmitting a command to the PLC, and updating a firewall security policy.

13. The method of claim 6 further comprising determining the baseline PLC program signature based on a training scan cycle times of the PLC program executing on the PLC during a training period.

14. The method of claim 6 further comprising determining the baseline PLC program signature based on calculated scan cycle times derived from execution times for one or more instructions of the PLC program.

15. A method comprising:
during operation of a programmable logic controller (PLC), collecting one or more scan cycle times of a PLC program executing on the PLC;
comparing one or more of the collected scan cycle times to a baseline PLC program signature;
outputting a first indicator that indicates a deviation of the PLC program operation from an expected PLC program operation based on the comparing;
receiving, from the PLC, an indication of progress of a proof of work function executed by the PLC;
comparing the progress of the proof of work function to an expected progress based on at least one of one or more of the collected scan cycle times and a count of the collected scan cycles; and
outputting a second indicator that indicates a deviation of the PLC program operation from the expected PLC program operation based on comparing the progress of the proof of work function.

16. The method of claim 15 further comprising transmitting the proof of work function to the PLC.

17. The method of claim 15, wherein outputting the first indicator comprises outputting an alert to a user using an output selected from the group consisting of e-mail, an on-screen alert, an event on a security information event monitor, and a text message.

18. The method of claim 15 further comprising, in response to the first indicator detecting the deviation of PLC program operation from the expected PLC program operation, changing a status of a network device.

19. The method of claim 18, wherein changing the status of the network device is selected from the group consisting of deactivating the PLC, reprogramming the PLC, transmitting a command to the PLC, and updating a firewall security policy.

20. The method of claim 15 further comprising determining the baseline PLC program signature based on one or more training scan cycle times of the PLC program executing on the PLC during a training period.

21. A method comprising:
during operation of a programmable logic controller (PLC), collecting one or more scan cycle times of a PLC program executing on the PLC;
comparing one or more of the collected scan cycle times to a baseline PLC program signature;
outputting a first indicator that indicates a deviation of the PLC program operation from an expected PLC program operation based on the comparing;
during operation of the PLC, collecting one or more scan cycle time verification values;
comparing one or more of the collected scan cycle time verification values to one or more of the collected scan cycle times; and
outputting a second indicator that indicates a deviation of the PLC program operation from the expected PLC program operation based on comparing one or more of the collected scan cycle time verification values to one or more of the collected scan cycle times.

22. The method of claim 21, wherein outputting the first indicator comprises outputting an alert to a user using an output selected from the group consisting of e-mail, an on-screen alert, an event on a security information event monitor, and a text message.

23. The method of claim 21 further comprising, in response to the first indicator detecting the deviation of PLC program operation from the expected PLC program operation, changing a status of a network device.

24. The method of claim 23, wherein changing the status of the network device is selected from the group consisting of deactivating the PLC, reprogramming the PLC, transmitting a command to the PLC, and updating a firewall security policy.

25. The method of claim 21 further comprising determining the baseline PLC program signature based on one or more training scan cycle times of the PLC program executing on the PLC during a training period.

26. A system comprising:
a receiver;
a transmitter;
a processor; and
a memory having stored thereon computer program code that, when executed by the processor, instructs the processor to:
collect, during operation of a programmable logic controller (PLC) and through the receiver, a first set of one or more scan cycle times of a PLC program executing on the PLC;
compare one or more of the collected scan cycle times to a baseline PLC program signature based on at least a mean value of a second set of scan cycle times, wherein comparing comprises:
calculating a cumulative difference between one or more of the collected scan cycle times and the mean value; and
comparing the cumulative difference to a cumulative sum threshold value; and
output, via the transmitter, a first indicator that indicates a deviation of the PLC program operation from an expected PLC program operation based on comparing one or more of the collected scan cycle times to the baseline PLC program signature.

27. The system of claim 26, wherein the computer program code further instructs the processor to collect the one or more scan cycle times of the first set by collecting one or more averages of two or more of the collected scan cycle times.

28. The system of claim 26, wherein:
comparing one or more of the collected scan cycle times comprises comparing each of the one or more collected scan cycle times to the baseline PLC program signature; and
calculating the cumulative difference comprises calculating the cumulative difference between each of the one or more collected scan cycle times and the mean value.

29. The system of claim 26, wherein:
the computer program code further instructs the processor to calculate one or more operational parameters based on one or more of the collected scan cycle times;
comparing one or more of the collected scan cycle times comprises comparing one or more of the operational parameters to one or more baseline parameters of the baseline PLC program signature; and
outputting the first indicator is based on comparing one or more of the operational parameters to one or more of the baseline parameters.

30. The system of claim 26, wherein the computer program code further instructs the processor to output the first indicator by transmitting, via the transmitter, an alert to a user using an output selected from the group consisting of e-mail, an on-screen alert, an event on a security information event monitor, and a text message.

31. The system of claim 26, wherein the computer program code further instructs the processor to, in response to the first indicator detecting the deviation of PLC program operation from the expected PLC program operation, change a status of a network device.

32. The system of claim 31, wherein changing the status of the network device is selected from the group consisting of turning off the PLC, reprogramming the PLC, transmitting a command to the PLC, and blocking a firewall port.

33. The system of claim 26, wherein the computer program code further instructs the processor to determine the baseline PLC program signature based on one or more training scan cycle times of the PLC program executing on the PLC during a training period.

34. A system comprising:
a receiver;
a transmitter;
a processor; and
a memory having stored thereon computer program code that, when executed by the processor, instructs the processor to:
collect, during operation of a programmable logic controller (PLC) and through the receiver, one or more of the collected scan cycle times of a PLC program executing on the PLC;
compare one or more of the collected scan cycle times to a baseline PLC program signature;
output, via the transmitter, a first indicator that indicates a deviation of the PLC program operation from an expected PLC program operation based on comparing one or more of the collected scan cycle times to the baseline PLC program signature;
receive, from the PLC and through the receiver, an indication of progress of a proof of work function executed by the PLC;
compare the progress of the proof of work function to an expected progress based on one or more of the collected scan cycle times; and
output, via the transmitter, a second indicator that indicates a deviation of the PLC program operation from the expected PLC program operation based on comparing the progress of the proof of work function.

35. The system of claim 34, wherein the computer program code further instructs the processor to transmit, via the transmitter, the proof of work function to the PLC.

36. The system of claim 34, wherein the computer program code further instructs the processor to output the first indicator by transmitting, via the transmitter, an alert to a user using an output selected from the group consisting of e-mail, an on-screen alert, an event on a security information event monitor, and a text message.

37. The system of claim 34, wherein the computer program code further instructs the processor to, in response to the first indicator detecting the deviation of PLC program operation from the expected PLC program operation, change a status of a network device.

38. The system of claim 37, wherein changing the status of the network device is selected from the group consisting of turning off the PLC, reprogramming the PLC, transmitting a command to the PLC, and blocking a firewall port.

39. The system of claim 34, wherein the computer program code further instructs the processor to determine the baseline PLC program signature based on one or more training scan cycle times of the PLC program executing on the PLC during a training period.

40. A system comprising:
a receiver;
a transmitter;
a processor; and
a memory having stored thereon computer program code that, when executed by the processor, instructs the processor to:
collect, during operation of a programmable logic controller (PLC) and through the receiver, one or more of the collected scan cycle times of a PLC program executing on the PLC;
compare one or more of the collected scan cycle times to a baseline PLC program signature;
output, via the transmitter, a first indicator that indicates a deviation of the PLC program operation from an expected PLC program operation based on comparing one or more of the collected scan cycle times to the baseline PLC program signature;
receive, through the receiver, one or more scan cycle time verification values;
compare one or more scan cycle time verification values to one or more of the collected scan cycle times; and
output, via the transmitter, a second indicator that indicates a deviation of the PLC program operation from the expected PLC program operation based on comparing one or more scan cycle time verification values to one or more of the collected scan cycle times.

41. The system of claim 40, wherein the computer program code further instructs the processor to output the first indicator by transmitting, via the transmitter, an alert to a user using an output selected from the group consisting of e-mail, an on-screen alert, an event on a security information event monitor, and a text message.

42. The system of claim 40, wherein the computer program code further instructs the processor to, in response to the first indicator detecting the deviation of PLC program operation from the expected PLC program operation, change a status of a network device.

43. The system of claim 42, wherein changing the status of the network device is selected from the group consisting of turning off the PLC, reprogramming the PLC, transmitting a command to the PLC, and blocking a firewall port.

44. The system of claim 40, wherein the computer program code further instructs the processor to determine the baseline PLC program signature based on one or more training scan cycle times of the PLC program executing on the PLC during a training period.

45. A method comprising:
identifying one or more instructions of a programmable logic controller (PLC) program or branch of a PLC program;
obtaining expected execution times for one or more of the instructions;
predicting an execution time of the PLC program or branch of the PLC program based upon calculation of one or more scan cycle times of the PLC program or branch of the PLC program based on the obtained expected execution times;
determining a baseline PLC program signature based on one or more of the calculated scan cycle times; and
storing the baseline PLC program signature.

46. A system comprising:
a receiver;
a processor; and
a memory having stored thereon computer program code that, when executed by the processor, instructs the processor to:
collect, during operation of a programmable logic controller (PLC) and through the receiver, one or more scan cycle times of a PLC program executing on the PLC;
calculate one or more baseline parameters based on one or more of the scan cycle times; and
determine a baseline PLC program signature comprising:
a first portion representing commonly executed program paths and determined based on one or more of the baseline parameters; and
a second portion representing undetected program paths and determined based on one or more of the calculated scan cycle times of the PLC program.

47. A method for detecting an endpoint security threat to a programmable logic controller (PLC) comprising:
storing a baseline PLC program time signature representative of a first set of one or more scan cycle times of a control program stored in a memory and executed by a central processing unit (CPU) of the PLC, one or more of the scan cycle times of the first set representative of embedded hardware and real-time deterministic operating conditions of the PLC;
during operation of the PLC, generating an operational program time signature representative of a second set of one or more scan cycle times of a PLC program executing on the PLC; and
comparing the operational program time signature to the stored baseline program time signature, wherein exceeding a predetermined threshold variance between the operational program time signature and the stored baseline program time signature identifies an endpoint security threat to the PLC indicative of reprogramming of the PLC.

48. The method of claim 47 further comprising outputting a first indicator of the likelihood that the predetermined threshold variance is exceeded, the PLC program executing on the PLC is not operating as intended, and that there is an endpoint security threat to the PLC indicative of reprogramming of the PLC.

49. The method of claim 48, wherein outputting the first indicator comprises outputting an alert to a user using an output selected from the group consisting of e-mail, an on-screen alert, an event on a security information event monitor, and a text message.

50. The method of claim 47, wherein the stored baseline PLC program time signature is formed in at least part by:
during a training period, collecting one or more of the scan cycle times of the first set of the control program executing on the PLC; and
calculating one or more baseline parameters derived by evaluation of one or more of the scan cycle times of the first set of the control program executing on the PLC;
wherein the baseline PLC program time signature comprises:
a first portion based on one or more of the baseline parameters; and
a second portion based on one or more of the collected scan cycle times of the first set of the control program executing on the PLC.

51. The method of claim 50, wherein one or more of the baseline parameters are derived from at least one from among statistical analysis, machine learning, or data science techniques applied to the collected one or more scan cycle times of the control program executing on the PLC.

52. The method of claim 50, wherein collecting the one or more of the scan cycle times of the first set of the control program executing on the PLC comprises collecting one or more averages of two or more of the scan cycle times of the first set of the control program executing on the PLC.

53. The method of claim 50, wherein the baseline PLC program time signature further comprises a third portion based on one or more calculated scan cycle times, the calculated scan cycle times based on the scan cycle times of the control program executing on the PLC.

54. The method of claim 47 further comprising:
providing a proof of work function to the PLC; and
receiving, from the PLC, an indication of progress of the proof of work function executed by the PLC;
wherein the indication of progress of the proof of work function verifies that one or more scan cycle times of the second set of the PLC program executing on the PLC are not being spoofed by an attacker or are being spoofed by an attacker.

55. The method of claim 47, wherein one or more of the scan cycle times of the PLC program executing on the PLC are estimated based on a scan cycle counter running on the PLC.

56. The method of claim 47, wherein the stored baseline PLC program time signature is formed in at least part by a mean value of scan cycle times of the first set of the control program executing on the PLC; and
wherein comparing the operational program time signature to the stored baseline program time signature to identify an endpoint security threat to the PLC indicative of reprogramming of the PLC comprises:
calculating a cumulative difference between one or more of the scan cycle times of the second set of the PLC program executing on the PLC and the mean value of the scan cycle times of the first set of the control program executing on the PLC; and
comparing the cumulative difference to a cumulative sum threshold value being the predetermined threshold variance.

57. The method of claim 56 further comprising outputting a first indicator based on the comparing of the cumulative difference to the cumulative sum threshold value.

58. The method of claim 56, wherein the stored baseline PLC program time signature is formed in at least part by a mean value of all of the scan cycle times of the control program executing on the PLC; and
wherein calculating the cumulative difference comprises calculating the cumulative difference of all of the scan cycle times of the PLC program executing on the PLC and the mean value.

59. The method of claim 47 further comprising:
outputting a first indicator of the likelihood that the predetermined threshold variance is exceeded, the PLC program executing on the PLC is not operating as intended, and that there is an endpoint security threat to the PLC indicative of reprogramming of the PLC;
receiving, from the PLC, an indication of the actual progress of a proof of work function executed by the PLC, wherein the indication of the actual progress of the proof of work function verifies that one or more scan cycle times of the second set of the PLC program executing on the PLC are not being spoofed by an attacker or are being spoofed by an attacker;
comparing the actual progress of the proof of work function to a calculated expected progress of the proof of work function; and
outputting a second indicator of the likelihood that the PLC program executing on the PLC is not operating as intended based on the comparing of the actual progress of the proof of work function to the calculated expected progress of the proof of work function.

60. The method of claim 47 further comprising, in response to detecting that the predetermined threshold variance is exceeded, changing a status of a network device.

61. The method of claim 60, wherein changing the status of the network device is selected from the group consisting of deactivating the PLC, reprogramming the PLC, transmitting a command to the PLC, updating a firewall security policy, and blocking a firewall port.

* * * * *